United States Patent Office 3,083,233
Patented Mar. 26, 1963

3,083,233
CHLOROMETHYLATION PROCESS
Saul R. Buc, Easton, Pa., assignor to General Aniline &
Film Corporation, New York, N.Y., a corporation of
Delaware
No Drawing. Filed Dec. 8, 1959, Ser. No. 858,036
6 Claims. (Cl. 260—612)

This invention relates to a novel chloromethylation process, and more particularly to the chloromethylation of o- and p-nitrophenyl alkyl ethers.

A number of chloromethylation processes are known, and in fact chloromethylation of nitroanisoles has been described in the literature. However, the processes for chloromethylating nitroanisoles described in the literature employ formaldehyde, zinc chloride and HCl, as the chloromethylating medium, and do not give reproducible results. Bischloromethyl ether is a known chloromethylating agent which has certain advantages, but this agent has not been found particularly effective for chloromethylating o- and p-nitrophenyl alkyl ethers.

It is an object of this invention to provide a process for chloromethylating o- and p-nitrophenyl alkyl ethers which will not be subject to the above disadvantages. Another object of this invention is the provision of such a process employing bischloromethyl ether. Other objects and advantages will appear as the description proceeds.

The attainment of the above objects is made possible by my invention which may be broadly described as a process comprising reacting two moles of a compound selected from the group consisting of o- and p-nitrophenyl alkyl ethers with about one mole of bischloromethyl ether in the presence of hydrated zinc chloride to produce the corresponding chloromethylated derivative of said compound. It has been unexpectedly found that in carrying out the above described chloromethylating process, hydration of the zinc chloride is essential for the attainment of satisfactory and reproducible results.

As the compound being chloromethylated, any o- and p-nitrophenyl alkyl ether may be employed, those containing from about 1 to 6 carbon atoms in the alkyl ether group being preferred. As examples of such compounds, there may be mentioned o- and p-nitroanisole, o- and p-nitrophenetole, in addition to the o- and p-nitrophenyl butyl, hexyl and cyclohexyl ethers and the like.

In carrying out the reaction, it is essential that hydrated zinc chloride be present. Generally, about .05 to 0.4 moles of zinc chloride are employed per mole of the compound being chloromethylated, although amounts outside this range may in some instances be found effective. The hydration of the zinc chloride is accomplished by also including in the reaction medium from about 1 to 8 moles of water per mole of zinc chloride. If desired, the water may be added in the form of aqueous hydrochloric acid of any suitable concentration, as for example the commercial concentrated hydrochloric acid (37%). Optimum results are obtained with about 4 moles of water per mole of zinc chloride.

The reaction is self-starting, exothermic, and generally completed without the addition of any heat within a period ranging from about 30 minutes to several hours or days, the longer reaction times being required when employing higher molar ratios of water to zinc chloride. Such higher ratios apparently reduce the catalytic activity of the zinc chloride. The temperatures of reaction will generally vary from about room temperature to 75° C. or so and usually need not be controlled. Upon completion of the reaction, the entire reaction mass is generally in the form of a crystalline solid which is preferably further treated to remove undesired catalyst and other impurities. This may be readily accomplished by melting and stirring the product in the presence of water, cooling, filtering off the granular precipitate, and washing the precipitate acid-free with water. The resulting product may be further purified by recrystallization from methanol or the like.

Since the nitro group in the compound being chloromethylated is meta directing, and the alkoxy group is ortho and para directing, substitution of the chloromethyl group in the benzene ring generally takes place readily and without formation of isomers and the like. The products of the present process constitute a group of highly effective intermediates for a wide variety of substituted anisidines which may be employed in the production of dyestuffs and the like. Prior to reduction of the nitro group to the corresponding amino group, the very reactive chlorine may be reacted with thiols, amines, phosphines, hydroxyl and alkoxyl-containing compounds and the like. The quaternary phosphine derivatives have insecticidal properties. For the preparation of a dyestuff, for example, the chloromethyl group in any of the products of this process may be converted to the corresponding methylol group, the nitro group reduced to an amino group, and the resulting compound condensed with an α-haloanthraquinone compound to prepare dyestuffs such as those disclosed in U.S. 2,560,887.

The following examples are only illustrative of this invention and are not to be regarded as limitative. All parts and proportions referred to herein and in the appended claims are by weight unless otherwise indicated.

Example 1

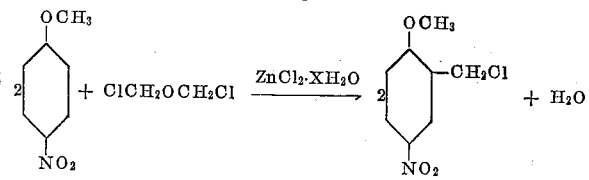

(a) In a suitable stirred vessel charge in order;

259 g. (1.69 moles) p-nitroanisole, 124 g. (1.08 moles) bis-chloromethyl ether,
57.5 g. (0.423 moles) $ZnCl_2$, and 49 g. conc. (37–38%) HCl. (This amount of HCl contains 1.69 moles $H_2O$ and immediately converts the $ZnCl_2$ to $ZnCl_2 \cdot 4H_2O$.)

The mixture becomes liquid on stirring a few minutes. The temperature rises to a maximum of 67° C. in one hour and 45 minutes later sets to a solid as the product crystallizes. The product is melted under water and allowed to resolidify in the presence of a large volume of water with stirring. The granular product is filtered, washed acid free, and air-dried. The crude yield is 334 g.=97%, M.P. 79–80.5 C. One crystallization from methanol yields 305 g.=89%, M.P. 78–81° C.

Other experiments similarly run show the effect and necessity of hydrating the $ZnCl_2$:

| Run No. | Catalyst | Crude Yield (Percent) | Purified Yield (Percent) |
|---|---|---|---|
| (b) | $ZnCl_2$ | 52 | 16 |
| (c) | $ZnCl_2 \cdot H_2O$ | 69 | |
| (d) | $ZnCl_2 \cdot 2H_2O$ | 80 | |

Example II.—Chloromethylation of o-Nitroanisole

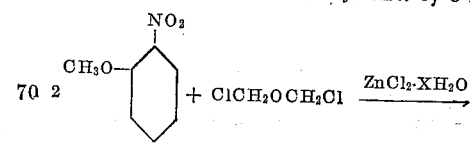

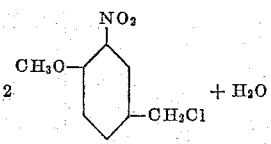

Using the procedure of Example I, eight runs are performed differing only in the degree of hydration of the ZnCl₂ catalyst. Each contains 76.5 g.=(0.5 mole) of o-nitroanisole, 36.0 g. (0.312 mole) bischloromethyl ether and 11.5 g. (0.085 mole) ZnCl₂. The results are summarized in the table:

| Run No. | Grams Conc. HCl | Moles H₂O/mole ZnCl₂ | Crude Product | | Recrystallized Product | |
|---|---|---|---|---|---|---|
| | | | Yield Percent | M.P., °C. | Yield, Percent | M.P., °C. |
| (a) | 0 | 0 | 89 | 78–101 | could not be crystallized to purity | |
| (b) | 2.47 | 1 | 91 | 79–86 | 80 | 81–4 |
| (c) | 4.93 | 2 | 93 | 80–87 | 86 | 82–5 |
| (d) | 7.41 | 3 | 90 | 81–88 | 83 | 82–6 |
| (e) | 9.87 | 4 | 95 | 86–90 | 91 | 84.5–87 |
| (f) | 12.34 | 5 | 95 | 84–88 | 90 | 85–87 |
| (g) | 14.85 | 6 | 91 | 77–83 | 80 | 85–87 |
| (h) | 19.75 | 8 | 91 | | 83 | 85–87.5 |

*Example III.—Chloromethylation of p-Nitrophenetole*

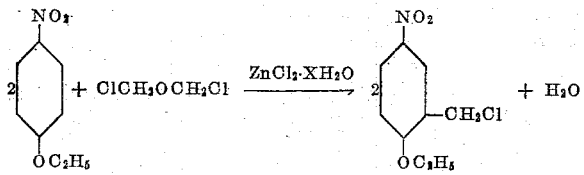

Charge in a stirred flask at room temperature 84 g. (0.5 mole) p-nitrophenetole, 36.0 g. bis-chloromethyl ether.
11.5 g. ZnCl₂, and 9.99 g. conc. HCl (37–38%) containing 6.15 g. (0.34 mole) of water.

The mixture slowly liquifies and the temperature slowly rises. Stir overnight. The mass solidifies. Melt, stir with water and cool. Filter the granular mass, wash acid free with water, air dry. Yield 99 g.=92%.

*Example IV.—Chloromethylation of o-Nitrophenetole*

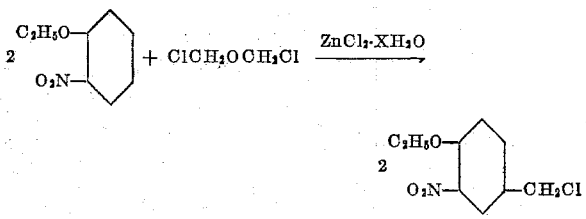

Charge in a stirred flask 102 g. (0.577 mole) o-nitrophenetole, 44.4 g. (0.386 mole) bis-chloromethyl ether, 14.0 g. (0.103 mole) ZnCl₂, and 11.49 g. conc. HCl containing 7.1 g. (0.395 mole) of water and mix at room temperature.

In 45 minutes, the temperature rises to 48° C.
Cool to 20° C. In about one hour, crystals form and in three hours the mixture is solid. Work up as in Example III. Yield 127.5 g.=95%.

*Example V*

This example shows that water alone is effective, and need not be added in the form of an HCl solution. The procedure of Example II (e) is repeated, except that instead of 9.87 g. of conc. HCl, 5.90 g. of distilled water is used.

Crude yield 106 g., M.P. 82–87° C.
Purified yield 87.6 g.=87%, M.P. 86–88° C.

*Example VI*

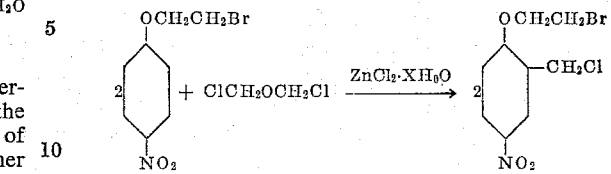

In a stirred flask charge 143 g. (.582 mole) p-nitrophenyl-2-bromoethyl ether, made according to Adams, JACS 45, 539 (1923),
36.6 g. (0.318 mole) bis-chloromethyl ether,
17 g. (.125 mole) ZnCl₂, and
14.1 g. 38% HCl and heat to 50° C., at which temperature the mixture becomes liquid.

Hold at 50° C. for one hour, raise to 70° C., hold for 2½ hours. Drown the liquid mixture in water. An oil separates which cannot be distilled, nor crystallized. However, its identity is established by hydrolysis to the crystalline diol, M.P. 115–116° C. which is analyzed:

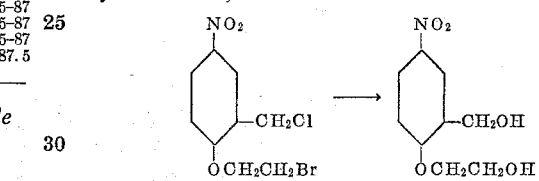

Calculated for C₉H₁₁NO₅: C=50.70; H=5.20. Found: C=50.76; H=5.27.

From the above, it will be understood that the alkoxy groups in the initial ether reactants and in their chloromethylated products in accordance with this invention may contain halogen substituents (e.g. chloro, bromo), preferably in terminal position. Illustratively the p-nitrophenyl-2-bromoethyl ether of Example VI may be substituted by p-nitrophenyl-3-bromopropyl ether, p-nitrophenyl-4-chlorobutyl ether, o-nitrophenyl-3-chloropropyl ether, o-nitrophenyl-4-bromobutyl ether, p-nitrophenyl-6-bromohexyl ether, and the like.

This invention has been disclosed with respect to certain preferred embodiments and various modifications and variations thereof will become obvious to persons skilled in the art and are intended to be included within the spirit and scope of this invention.

I claim:
1. A process comprising reacting two moles of a compound selected from the group consisting of ortho and para nitrophenyl alkyl ethers with about one mole of bischloromethyl ether in the presence of about 0.05 to 0.4 mole of zinc chloride per mole of said compound, and about 1 to 8 moles of water per mole of zinc chloride.
2. The process of claim 1 wherein said compound is p-nitroanisole.
3. The process of claim 1 wherein said compound is o-nitroanisole.
4. The process of claim 1 wherein said compound is p-nitrophenetole.
5. The process of claim 1 wherein said compound is o-nitrophenetole.
6. The process of claim 1 wherein said compound is p-nitrophenyl-2-bromoethyl ether.

References Cited in the file of this patent
UNITED STATES PATENTS

| 1,887,396 | Brunner | Nov. 8, 1932 |
| 2,486,542 | Weisler et al. | Nov. 1, 1949 |

OTHER REFERENCES

Thomas: Anhydrous Aluminum Chloride in Organic Chemistry (1941), p. 876.